United States Patent [19]
Yamana et al.

[11] Patent Number: 4,937,683
[45] Date of Patent: Jun. 26, 1990

[54] IMAGE RECORDING APPARATUS

[75] Inventors: Keiichi Yamana; Yutaka Korogi, both of Kanagawa, Japan

[73] Assignee: Fuji Photo Co., Ltd., Kanagawa, Japan

[21] Appl. No.: 199,728

[22] Filed: May 27, 1988

[30] Foreign Application Priority Data

May 29, 1987 [JP] Japan .............................. 62-136810

[51] Int. Cl.$^5$ ............................................. H04N 1/04
[52] U.S. Cl. .................... 358/474; 358/498; 358/496
[58] Field of Search ............... 358/102, 285, 293, 294, 358/474, 494, 496, 498; 355/64, 271

[56] References Cited

U.S. PATENT DOCUMENTS

| | | | |
|---|---|---|---|
| 3,697,173 | 10/1972 | Sasaki et al. | 355/27 |
| 3,972,610 | 8/1976 | Gross | 355/271 |
| 4,393,411 | 7/1983 | Amtower | 358/496 |
| 4,461,566 | 7/1984 | Plumadore | 355/66 |
| 4,475,128 | 10/1984 | Koumura | 358/496 |
| 4,572,649 | 2/1986 | Takahashi et al. | 355/133 |
| 4,598,323 | 7/1986 | Honjo et al. | 358/496 |
| 4,656,524 | 4/1987 | Norris et al. | 358/909 |
| 4,671,647 | 6/1987 | Komiya et al. | 355/14 R |
| 4,685,638 | 8/1987 | Satoyoshi et al. | 242/199 |
| 4,716,470 | 12/1987 | Levine | 358/909 |
| 4,766,461 | 8/1988 | Ohtsuka | 355/271 |
| 4,769,694 | 9/1988 | Oshikoshi | 358/909 |
| 4,786,971 | 11/1988 | Kaneko et al. | 358/909 |

*Primary Examiner*—Edward L. Coles, Sr.
*Attorney, Agent, or Firm*—Sughrue, Mion, Zinn, Macpeak & Seas

[57] ABSTRACT

An image recording apparatus for focusing an image recored on an original onto a film so as to form an image on the film. The apparatus has a movable original table, a scanning mirror device adapted to be moved in accordance with the movement of the original so as to scan the image on the original, and a lens for focusing the light reflected from the scanning mirror onto the film which is held stationary. Since the lens and the film are not required to move, the image can be focused on the film with a high degree of precision.

17 Claims, 10 Drawing Sheets

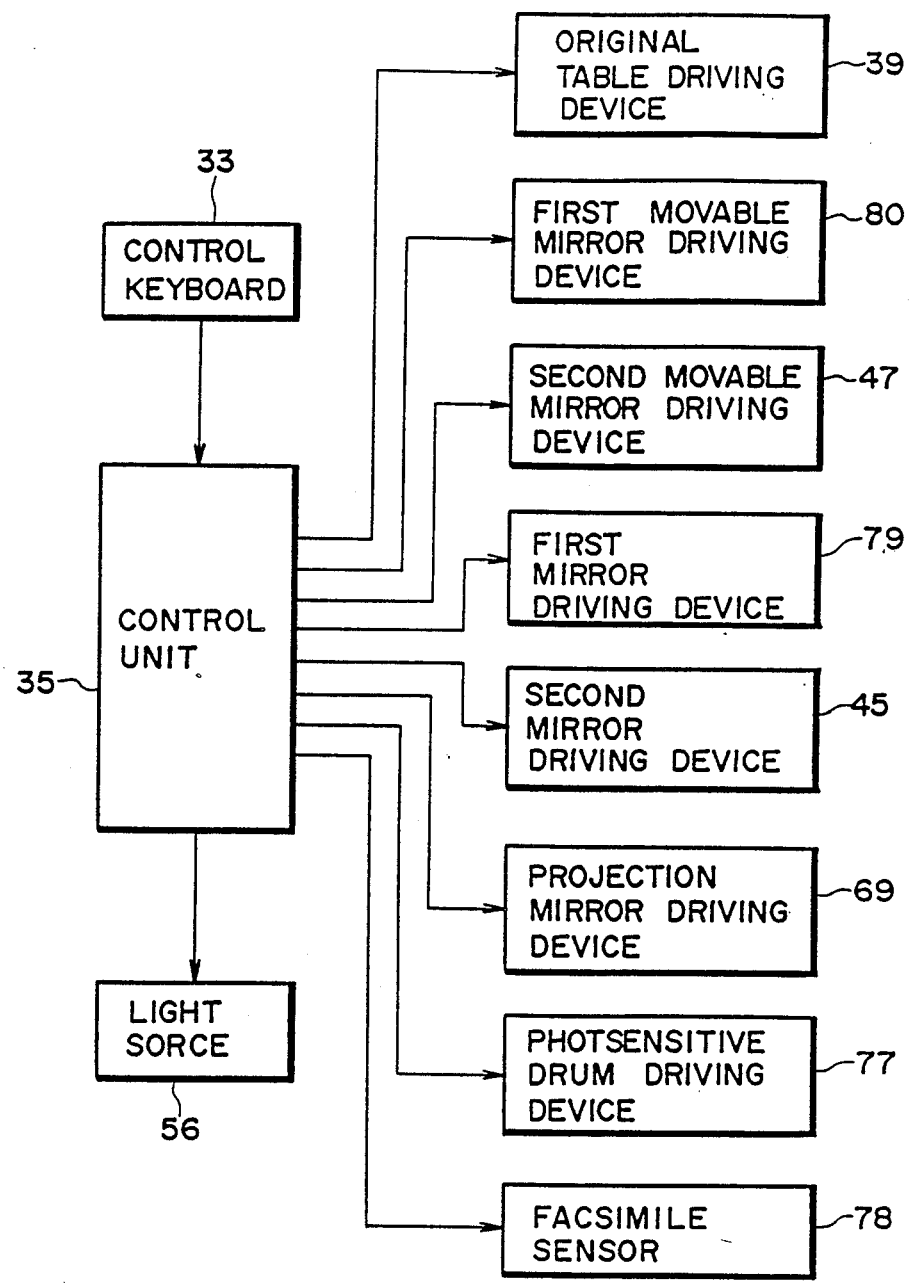

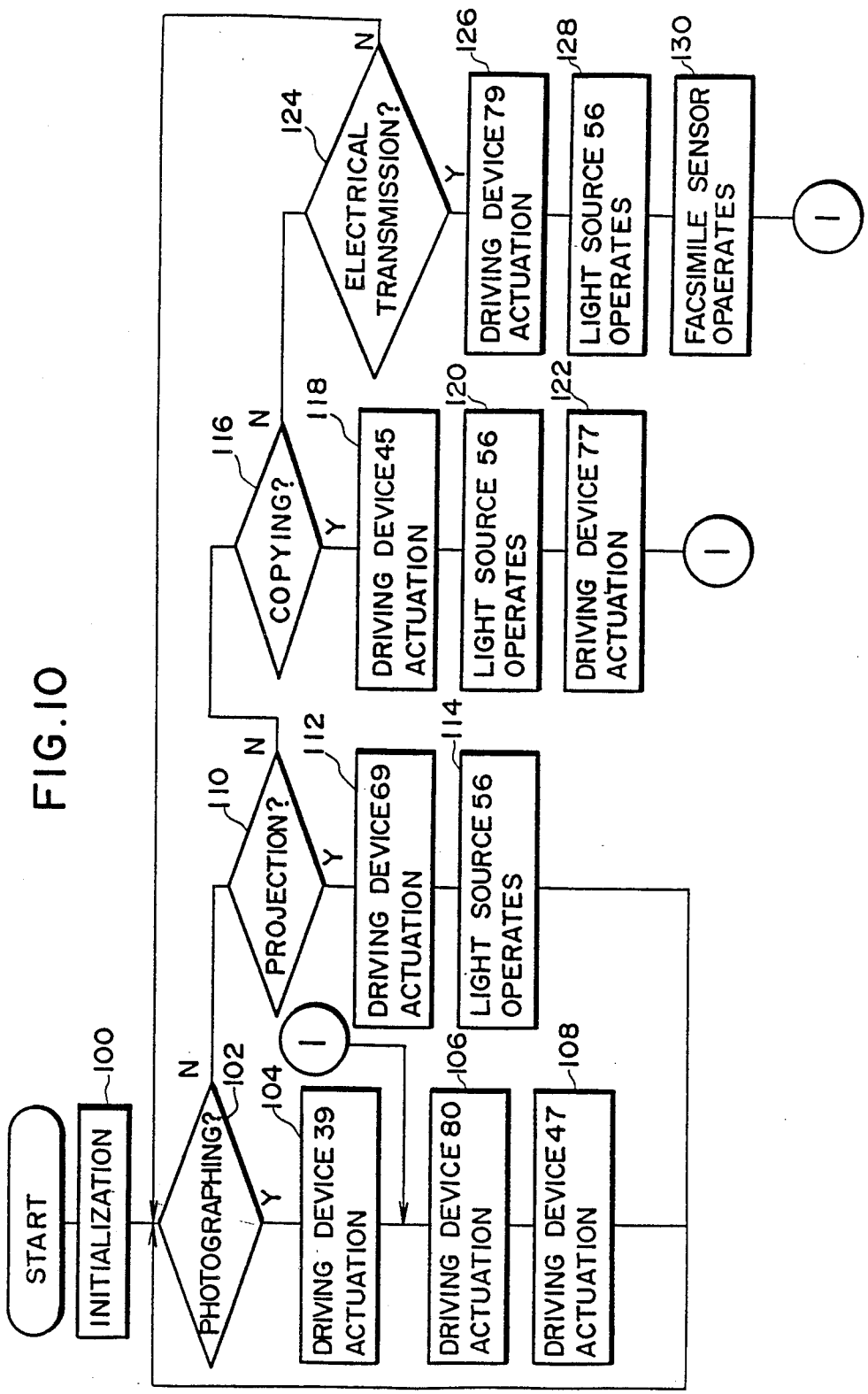

IMAGE RECORDING APPARATUS

BACKGROUND OF THE INVENTION

Field of the Invention

The present invention relates to an image recording apparatus for recording on a film an image carried by an original.

Electrophotographic apparatus have been known which are used as image recording apparatus for recording an image in a predetermined frame of a photographic film such as a microfilm, the recorded image being projected onto a screen or printed on a copy paper. Examples of such electrophotographic apparatus are disclosed in U.S. Pat. Nos. 3,697,173, 3,972,610, 4,461,566 and 4,671,647.

In general, electrophotographic apparatus of this kind have a plurality of optical systems for performing different functions: namely, a photographing optical system for photographing the original image and recording the photographed image on a predetermined frame of a photosensitive film (electrophotographic film), a projection optical system for projecting the recorded image on a screen, and a copying optical system for focusing the recorded image on a copying photosensitive drum.

The photographing optical system is designed such that a scanning lens or the photosensitive film is made to run in the direction of the scan so as to focus the original image on the photosensitive film in a smaller scale, i.e., in a contracting manner. Therefore, the image on the photosensitive film tends to be adversely affected even by a slight error in the movement of the scanning lens or the film, resulting in a deterioration in the precision of the image.

In addition, each of these optical systems requires a considerably long path of light, thus requiring a wide space with the result that the size of the apparatus becomes large.

Furthermore, the constructions of the optical systems are complicated because the optical systems have to be designed and disposed in such a manner as to avoid any mutual interference.

In addition, the size of the electrophotographic apparatus of this type is increased also by the necessity for a wide space which is essential for the scanning of the image.

SUMMARY OF THE INVENTION

Accordingly, an object of the present invention is to provide an image recording apparatus which is improved to enable an image to be focused on a film with a high degree of precision, without requiring movement of the scaning lens or the film.

Another object of the present invention is to provide an image recording apparatus which enables the mechanism to be simplified and the size to be reduced, while maintaining required lengths of the optical paths in the respective optical systems.

To this end, according the one aspect of the present invention, there is provided an image recording apparatus for focusing a first image recorded on an original onto a film, the apparatus comprising: a movable original table for mounting an original; a slit disposed in a direction perpendicular to the direction of movement of the original table; scanning mirror means capable of moving in the direction of movement of the original table so as to scan an image on the original through the slit; and a lens for focusing the light reflected by to mirror means onto to film which is held stationary.

In consequence, the light from the image original carried by the original table is made to impinge upon the scanning mirror means through the slit. This scanning mirror means moves to scan the first image and reflects the light towards the scaning lens. The image light reflected by the scanning mirror means is converged by the lens so as to form a contracted image on the film.

Thus, the image recording apparatus according to the first aspect of the invention does not require the lens and the film to be moved, so that the desired image can be focused on the film with a high degree of precision.

According to another aspect of the present invention, there is provided an image recording apparatus for focusing a first image recorded on an original onto a film so as to form a second image on the film and for copying the second image formed on the film onto a photosensitive member, comprising: a movable original table for mounting an original; a slit provided to extend in the direction perpendicular to the direction of movement of the original table; a first light source for illuminating the original through the slit; a second light source for illuminating the film; a rotatable copying photosensitive drum carrying at its surface the photosensitive member; and scanning mirror means capable of scanning, through the slit, the original which is being moved by the original table while being illuminated with the light from the first light source, thereby to focus the first image onto the film which is stationary, the scanning mirror means further capable of scanning the film while the film is being illuminated by the light from the second light source, thereby focusing the second image onto the photosensitive member on the copying photosensitive drum.

In the image recording apparatus according to this aspect, the second image, i.e., the image recorded on the film, is scanned by the scanning mirror means and is focused on the image detecting surface of an image transmitting image detector. The second image, therefore, can be electrically transmitted to another place.

According to still another aspect of the present invention, there is provided an image forming apparatus capable of scanning a first image recorded on an original thereby photographing and focusing the first image onto a film so as to form a second image on the film, and capable of scanning the second image on the film so as to focus the second image onto a photosensitive member on a photosensitive drum, thereby copying the second image onto the photosensitive member, comprising scanning mirror means for scanning the second image; and image detection device for electrical transmission having an image detection surface on which the second image is focused through scanning of the second image by the scanning mirror means.

In the image recording apparatus of this aspect, the image recorded on the film is scanned by a scanning mirror which is used during photographing and copying. This arrangement eliminates the necessity for the provision of separate scanning mirror means: i.e., scanning mirror means for focusing the recorded image onto the image detection surface of an electrical transmission detector and scanning mirror means for photographing and copying. In addition, it is not necessary to preserve any substantial space for the movement of the scanning mirror. In consequence, the mechanism of the optical system is simplified and the size of the image recording apparatus is reduced.

The above and other objects, features and advantages of the present invention will become clear from the following description of the preferred embodiments when the same are read in conjunction with the accompanying drawings.

BRIEF DESCRIPTION OF THE DRAWINGS

FIG. 9 is a block diagram of a control unit and a driving device; and

FIG. 10 is a flow chart illustrating the operation of the control unit.

DESCRIPTION OF THE PREFERRED EMBODIMENTS

FIGS. 1, 2 and 4 through 8 show optical systems used in an electronic photographic apparatus embodying the present invention. Generally, the electrophotographic apparatus has a projection optical system, a copying optical system and an electrical transmission optical system. As will be seen from these Figures, these optical systems are disposed in a housing 20 which is provided on an upper portion of the electrophotographic apparatus. As will be seen from FIGS. 1 and 5, the housing 20 is composed of a left portion 20A and a substantially parallelepiped right portion 20B which are communicated with each other at their interiors.

Figure 1:
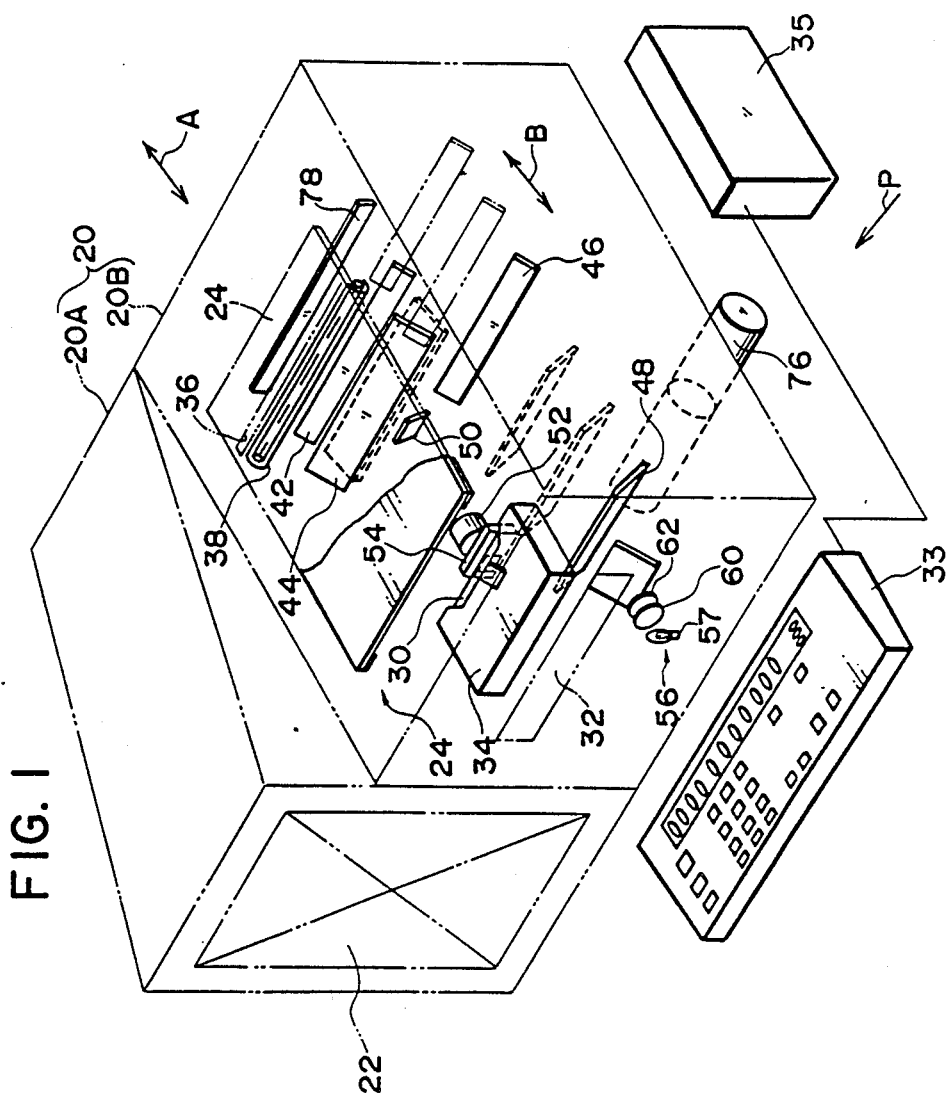
FIG. 1 is a perspective view of an image recording apparatus in accordance with the present invention, showing particularly a photographing optical system, a copying optical system and an electrical transmission optical system.
Figure 2:
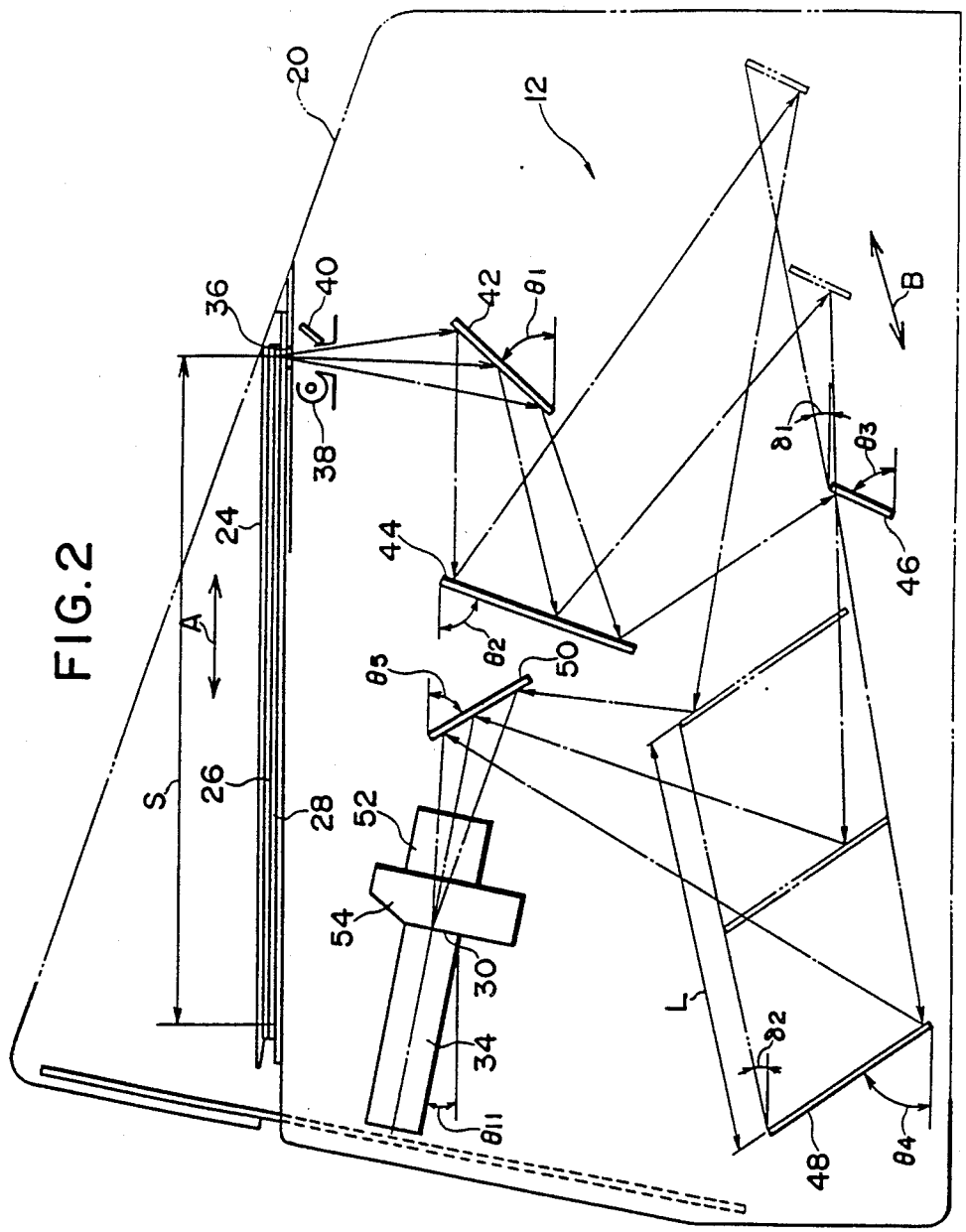
FIG. 2 is a view of the photographing optical system as viewed in the direction of an arrow P.

Referring now to FIGS. 1 and 2, a screen 22 is provided on the front portion of the housing 20A, while an original table 24 is disposed on an upper portion of the housing 20. The original table 24 has a transparent glass plate 28 and an original pressing plate 26 which is movable towards and away from the transparent glass plate 28. The arrangement is such that an original (not shown) is placed on the glass plate 28 with the image-carrying side thereof directed downward and pressed by means of the original pressing plate 26. The original table 24 is adapted to be driven in the direction of an arrow A by the power produced by a driving device 39 (see FIG. 9).

A cassette mounting opening 32 is provided on the front side of the housing 20B through which a cassette 34 having an electrophotographic film 30 is mounted. The distance S of movement of the original table 24 is set at about 310 mm. Cassettes of the type shown in U.S. Pat. Nos. 4,572,649 and 4,685,638 are usable as the cassette 34 in this electrophotographic apparatus.

A control keyboard 33 through which various operations of the electrophotographic apparatus are controlled is disposed on the front side of the housing 20. The control keyboard 33 is connected to a control unit 35 which conducts various controls of operation of the electrophotographic apparatus.

A narrow slit 36 is provided on an upper portion of the housing 20B so as to extend in the breadthwise direction of the original table 24, i.e., in the direction perpendicular to the direction of movement of the original table 24. The image of the original on the original table 24 is projected as a micro-image onto the electrophotographic film 30 through the slit 36, by means of a photographing optical system 12 which is disposed in the housing 20.

The detail of the photographing optical system 12 will be described hereinunder with specific reference to FIGS. 1 and 2.

FIG. 1 is a perspective view of an upper portion of an electrophotographic apparatus, while FIG. 2 is a view of the photographing optical system as viewed in the direction of the arrow P.

An original illuminating lamp 38 is disposed under the slit 36 provided in the housing 20B. A mirror 40 is disposed in such a manner as to oppose the original illuminating lamp 38. The light from the illuminating lamp 38 and the light reflected by the mirror 40 are made to illuminate the surface of the original through the glass plate 28 via the slit 36.

A thin-walled rectangular first mirror 42 is disposed under the mirror 40 and the illuminating lamp 38 so as to extend in the longitudinal direction of the slit 36. The first mirror 42 is disposed such that its reflection surface is oriented leftward and upward as viewed in FIG. 2. More specifically, the reflection surface of the first mirror 42 is inclined at an angle $\theta_1$ to the horizontal direction. In the illustrated embodiment, the angle $\theta_1$ is set to be 50°.

A second mirror 44 is disposed in front of the first mirror 42 such that its reflection surface opposes the reflection surface of the first mirror 42. The second mirror 44 has a thin-walled rectangular form and is inclined at an angle $\theta_2$ to the horizontal direction. In the illustrated embodiment, the angle $\theta_2$ is set to be 72.5°. The second mirror 44 is adapted to receive the light reflected by the first mirror 42.

A first movable mirror 46 is disposed under the first mirror 42. The first movable mirror 46 is disposed such that its reflection surface is oriented in the same direction as the first mirror 42 and is inclined at an angle $\theta_3$ to the horizontal direction.

The first movable mirror 46 is adapted to be driven by a driving device 80 (see FIG. 3) in a direction which makes an angle $\delta_1$ with respect to the horizontal direction. The angle $\delta_1$ is set to be 12.5° in the illustrated embodiment.

Figure 3:
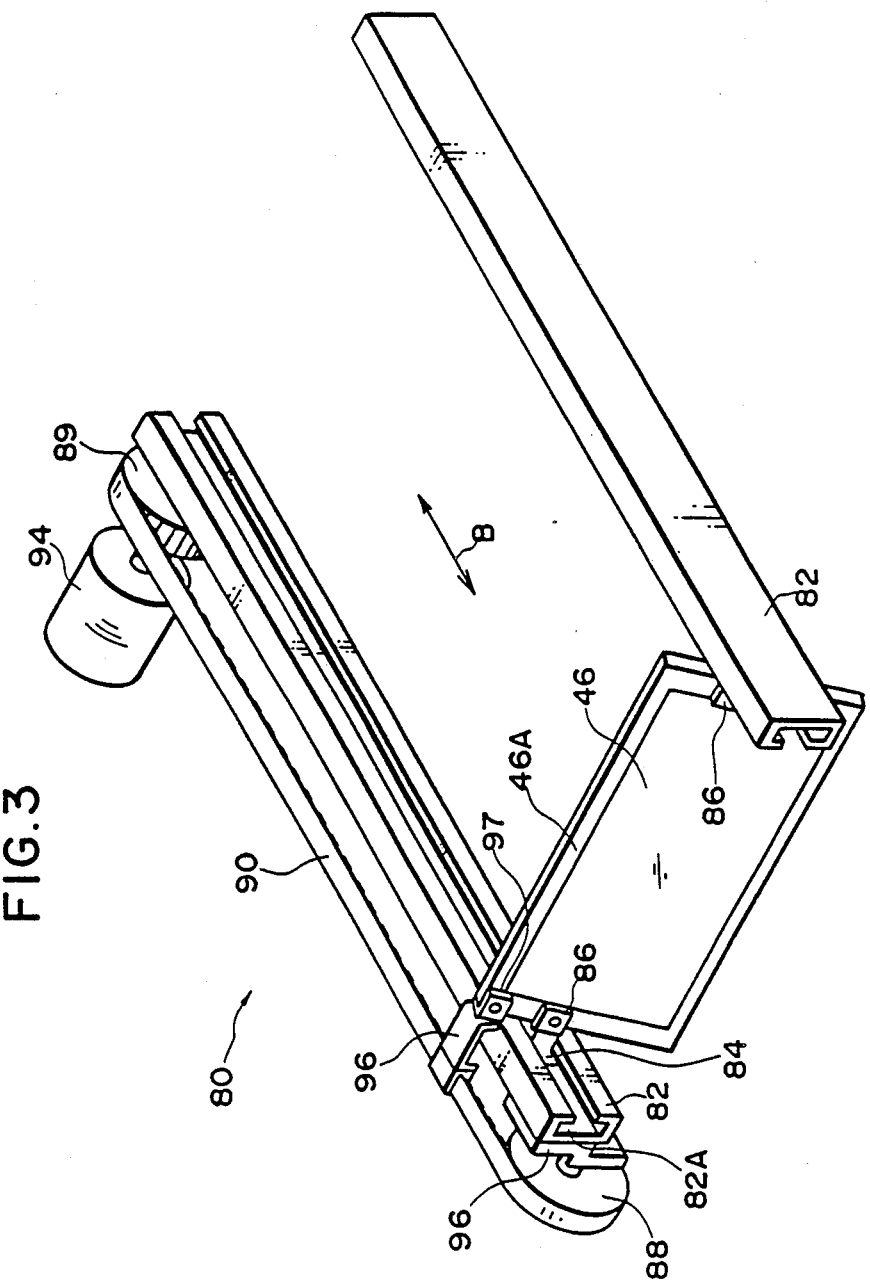
FIG. 3 is a perspective view of a driving device for driving a first movable mirror.

Referring now to FIG. 3, the driving device 80 is provided at its both ends with guide rails 82 in the direction of movement of the first movable mirror 46 which is indicated by an arrow B in FIG. 3. The guide rails 82 are provided with channels 82A which receive sliders 84 for movement in the longitudinal direction of the guide rails 82. The sliders 84 are connected to both sides of an outer frame 46A of the first movable mirror 46 through respective brackets 86.

One of the guide rails 82 is provided at its both longitudinal ends with pulleys 88, 89. The front end pulley 88 is rotatably supported by the guide rail 82 through a bracket 96. The rear end pulley 89 is fixed to the drive shaft of the motor 94. The motor 94 is connected to the control unit 35. A timing belt 90 is stretched between the pulleys 88 and 89.

The timing belt 90 is connected to the outer frame 46A of the first movable mirror 46 through brackets 96 and 97.

In operation, the timing belt 90 is made to run by the power of the motor 94 so that the first movable mirror 46 is moved in the direction of the arrow B along the guide rails 82.

As will be seen from FIG. 2, a second movable mirror 48 is disposed in front of the first movable mirror 46. The second movable mirror 48 is mounted such that its reflection surface opposes the reflection surface of the first movable mirror 46, and is inclined at an angle of $\theta_4$ with respect to the horizontal direction. The second movable mirror 48 is adapted to be driven in a direction which makes an angle of $\delta_2$ with respect to the horizontal direction. When the angle $\delta_2$ is set to be 57.5° as will be described later, the angle $\delta_{11}$ is set to be 12.5°. The driving of the second movable mirror 48 is effected by a driving device 47 (see FIG. 9) which is similar to the driving device 80 for driving the first movable mirror 48.

The movement of the second movable mirror 48 is effected corresponding to the movement of the original table 24 and the first movable mirror 46, and the distance L of movement is given by the following formula (1).

$$L = S/(2 \sin)\theta \quad (1)$$

where, S represents the stroke or distance of movement of the original table 24, while $\theta$ represents the angle formed between the first movable mirror 46 and the second movable mirror 48. Substituting S=310 and $\theta = 180° - (\theta_3 + \theta_4) = 57.5°$ into formula (1) above, the distance L of movement of the second mirror 48 is calculated as follows.

$$L = 310/(2 \sin 57.5°) = 183.78 \text{ mm}.$$

The light reflected by the second movable mirror 48 impinges upon the third mirror 50.

The third mirror 50 is disposed in front of the second mirror 44. The third mirror 50 has a reflection surface which is oriented leftward and downward in FIG. 2 so as to oppose the reflection surface of the second movable mirror 48, and is inclined at an angle $\theta_5$ with respect to the horizontal direction. In the illustrated embodiment, the angle $\theta_5$ is set to be 60°.

A lens 52 is disposed in front of the third mirror 50 and a process head 54 and an electrophotographic film 30 received in the cassette 34 are disposed in front of the process head 54. The cassette 34 is inclined at an angle $\theta_{11}$ with respect to the horizontal direction. In the illustrated embodiment, the angle $\theta_{11}$ is set to be 10°. The lens 52 is adapted for converging the light reflected by the third mirror 50 onto the electrophotographic film 30 through the process head 54. The process head 54 is capable of performing a series of steps including charging, exposure, development, drying and fixing, for each of the frames on the electrophotographic film 30. For instance, process head disclosed in Japanese Patent Unexamined Publication No. 59-100479 can be used as the process head of the electrophotographic apparatus of the invention.

As will be seen from FIG. 9, the driving device 39 for driving the original table 24, the driving device 80 for driving the first movable mirror 46 and the driving device 47 for driving the second movable mirror 48 are connected to the control unit 35. A description will be made hereinunder as to the projection optical system 14, with specific reference to FIGS. 4, 5 and 6. The projection optical system 14 is intended for projecting the image recorded on the electrophotographic film 30 onto a projection screen 22 at a greater scale, i.e., in magnification.

Figure 5:
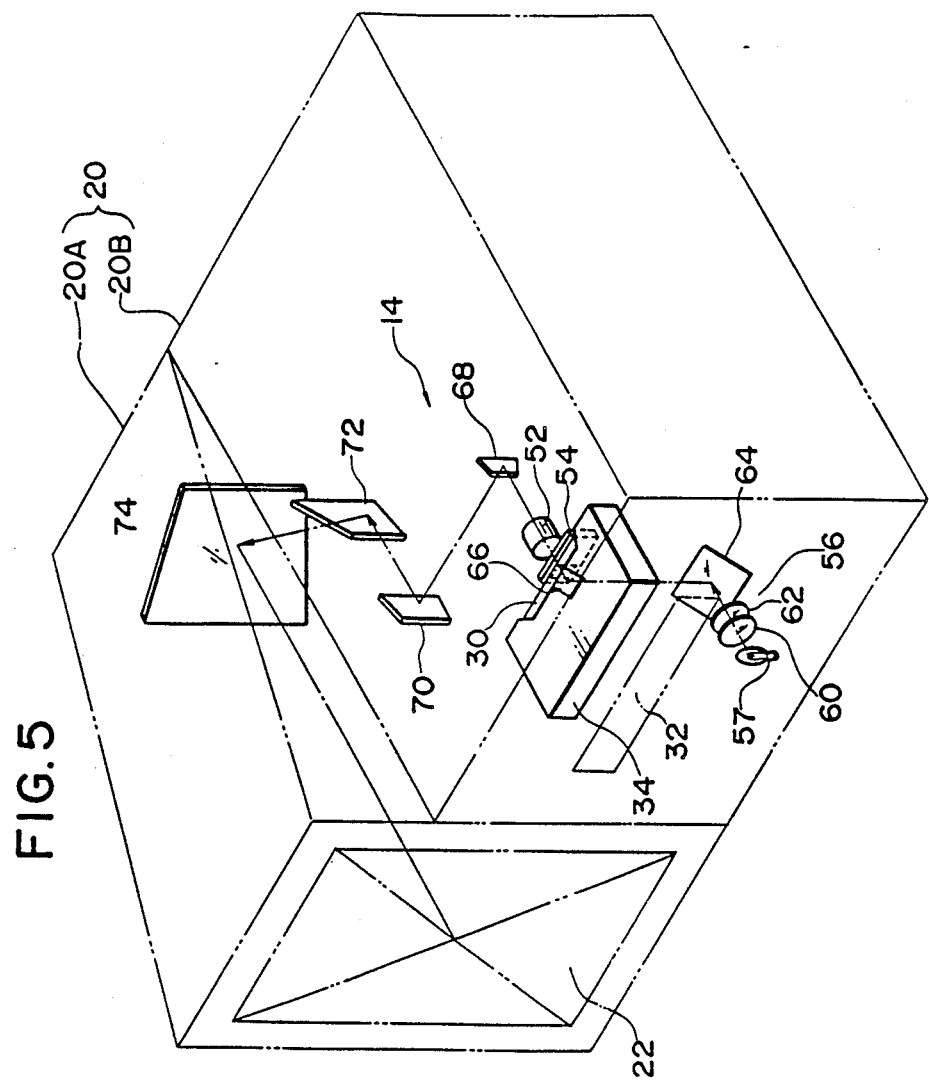
FIG. 5 is a perspective view corresponding to FIG. 1, illustrating particularly a projection optical system.
Figure 6:
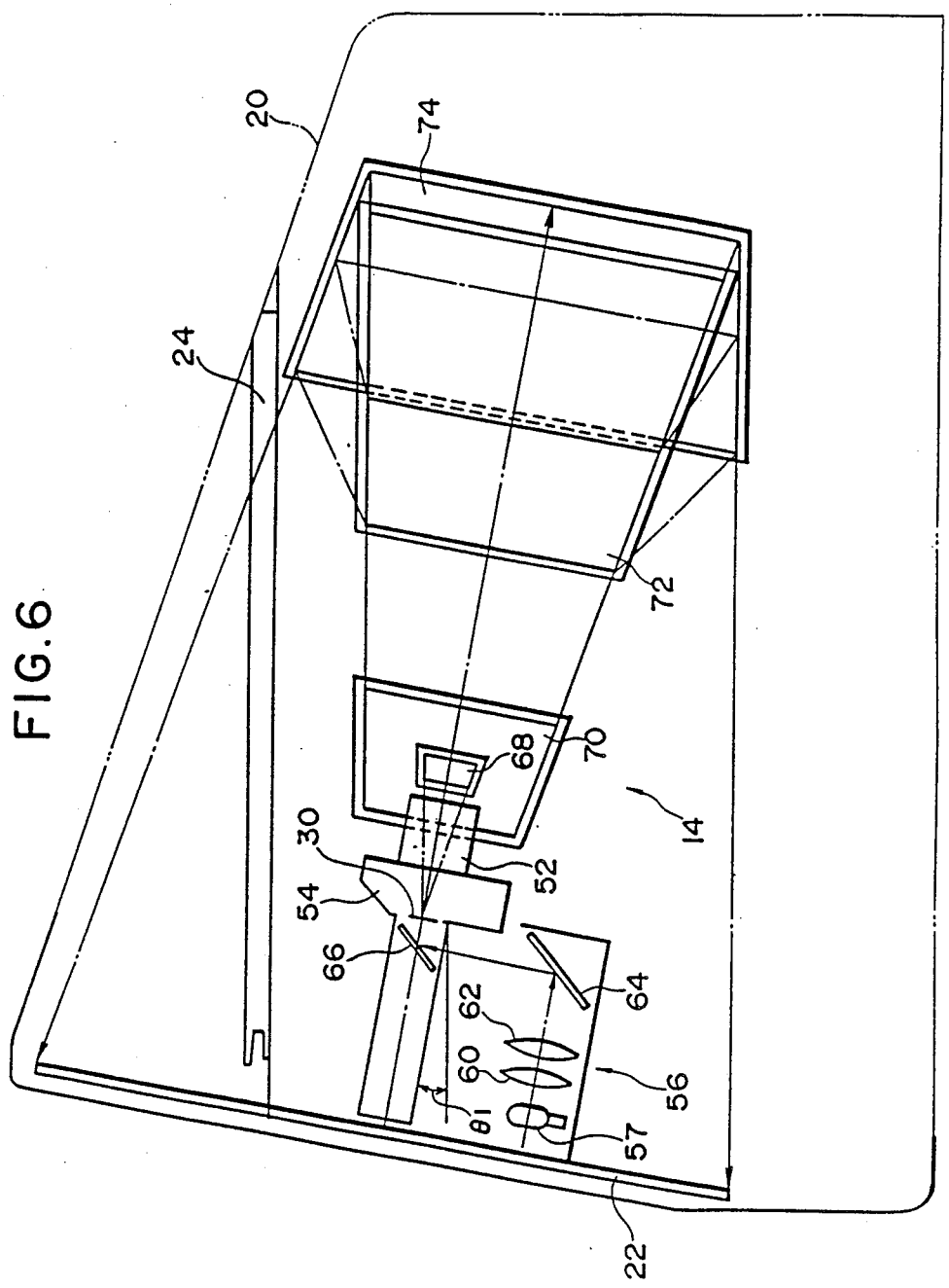
FIG. 6 is a view corresponding to FIG. 2, illustrating particularly the projection optical system.

As will be seen from FIGS. 5 and 6, the projection optical system has a light source 56 disposed under the cassette 34. The light source 56 has a lamp 57, a pair of condenser lenses 60, 62, and a mirror 64. The arrangement is such that the light from the lamp 57 is made to pass through the condenser lenses 60,62 and then reflected by the mirror 64 so as to impinge upon a mirror 66.

The mirror 66 is disposed on the reverse side of the electrophotographic film 30 (inner side of the cassette) so as to reflect the light from the mirror 64 towards the electrophotographic film 30.

The process head 54 and the lens 52 are disposed on the reverse side of the electrophotographic film 30 (outer side of the cassette). The process head 54 and the lens 52 are disposed in the same manner as those in the photographing optical system 12 described before. A projection is disposed on the rear side of the lens 52. The projection mirror 68 is adapted to be rotated by the power of the driving device 69 from a position between the third mirror 50 and the lens 52 to a position shown by a two-dot-and-dash line in FIG. 4, for the photographing of the original and for the copying. When it is desired to project the image onto the screen, the projection mirror 68 is rotated to a position between the third mirror 50 and the lens 52 (position shown by solid line in FIG. 4). The projection mirror 68, when rotated to the position between the third mirror 50 and the lens 52, directs its reflection surface towards the housing 20A at an inclination angle of $\theta_6$ with respect to the optical axis. In the illustrated embodiment, the angle $\theta_6$ is set to be 45°. The light reflected by the projection mirror 68 impinges upon the projection mirror 70.

The projection mirror 70 is disposed in the housing 20B such that its reflection surface opposes the reflection surface of the projection mirror 68.

Figure 4:
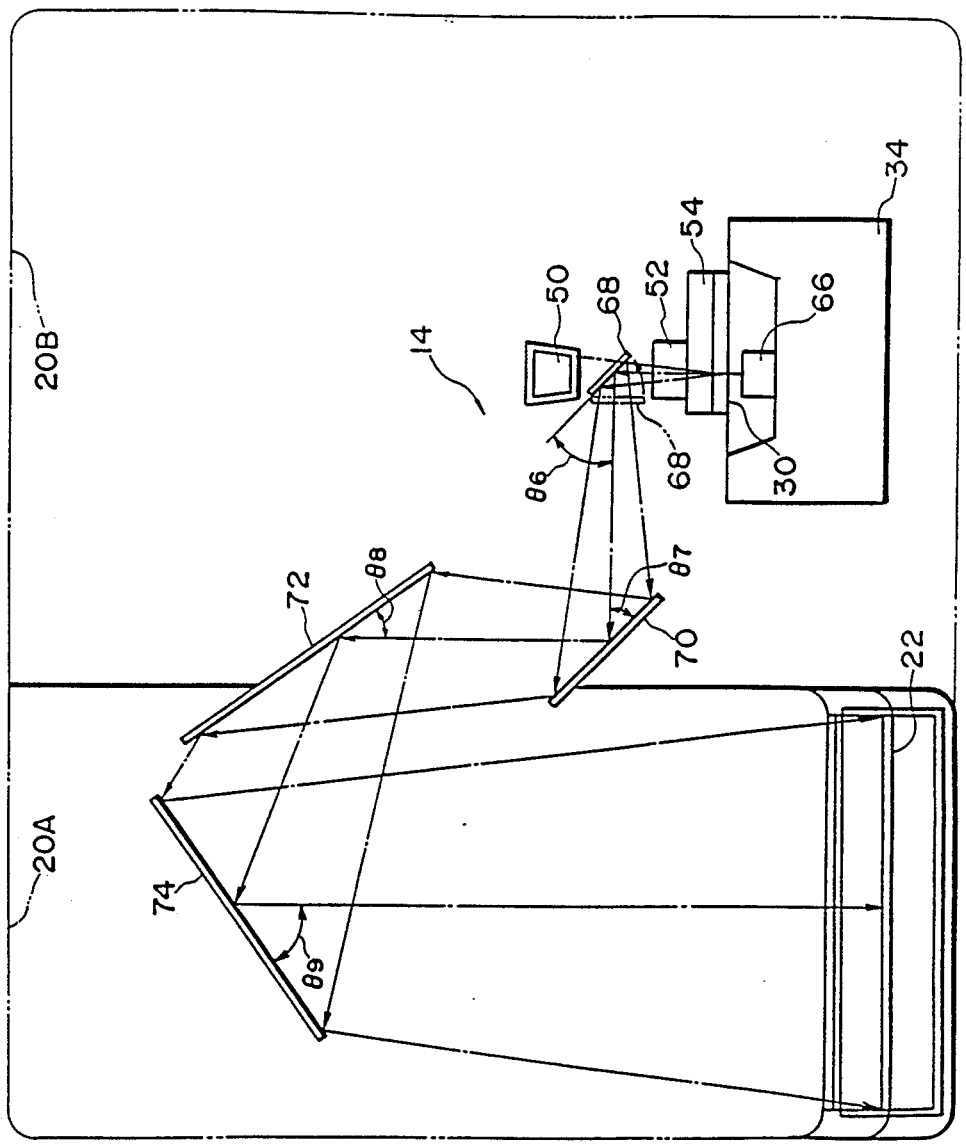
FIG. 4 is a plan view of a projection optical system.

As shown in FIG. 4, the projection mirror 70 is disposed such that its reflection surface is directed rearward at an angle $\theta_7$ with respect to the optical axis. In the illustrated embodiment, the angle $\theta_7$ is selected to be 45°.

A projection mirror 72 greater than the projection mirrors 68 and 70 is disposed behind the projection mirror 70. The projection mirror 72 has a reflection surface opposing the reflection surface of the projection mirror 70 and is inclined at an angle $\theta_8$ with respect to the optical axis of the reflected light. In the illustrated embodiment, the angle $\theta_8$ is selected to be 35°.

A projection mirror 74 greater than the projection mirror 72 is disposed at a lateral side of the projection mirror 72. The projection mirror 72 has a reflection surface which opposes the reflection surface of the projection mirror 72 and is inclined at an angle $\theta_9$ with respect to a line normal to the screen 22. In the illustrated embodiment, the angle $\theta_9$ is determined to be 55°. The projection 74 receives the light reflected by the projection mirror 72 and reflects this light towards the screen 22 thereby projecting the light image.

The light source 56 and the driving device for the projection mirror 68 and connected to the control unit 35 as shown in FIG. 9.

A description will be made hereinunder as to the copying optical system 16 with specific reference to FIG. 7.

The copying optical system 16 is intended for projecting the image recorded in the electrophotographic film 30 at a magnification onto a copying photosensitive drum 76 which is disposed under the housing 20.

The copying optical system employs a light source for illuminating the electrophotographic film 30. This light source is the light source 56 used in the projection optical system described before. The lens 52 used in the photographing optical system and in the projection optical system 14 also is employed in the copying optical system 16.

The copying optical system 16 also employs a third mirror 50, second movable mirror 48, first movable mirror 46 and the second mirror 44 which are used in the photographing optical system.

Figure 7:
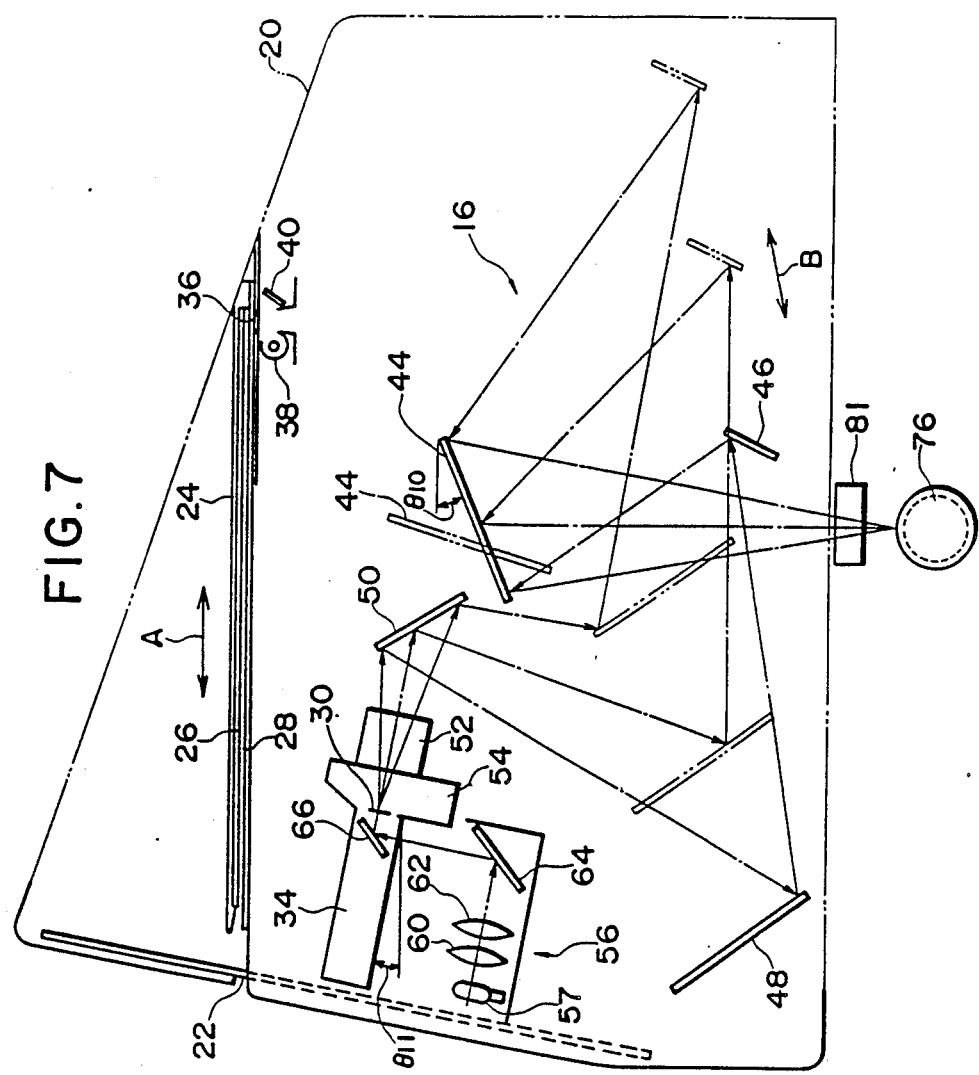
FIG. 7 is a view corresponding to FIG. 2, illustrating particularly a copying optical system.

The second mirror 44, when used in the copying optical system 16, is rotated by a driving power of a driving device 45 (see FIG. 9) from a position shown by the two-dot-and-dash line to a position of the solid line in FIG. 7. The second mirror 44, when placed in the position shown by the solid line in FIG. 7, directs its reflection surface downward as viewed in FIG. 7, and is inclined at an angle $\theta_{10}$ with respect to the horizontal direction. In the illustrated embodiment, the angle $\theta_{10}$ is set to be 22.520 . A lens 81 is disposed under the second mirror 44 and a copying photosensitive drum 76 is disposed under the lens 81. The copying photosensitive drum 76 is adapted to be rotated in a predetermined direction by a driving device 77 (not illustrated but shown by a block in FIG. 9). The rotation of the copying photosensitive drum 76 is performed in synchronization with the movement of the first movable mirror 46 and the second movable mirror 48.

The second mirror 44 and the driving device 77 of the copying photosensitive drum 76 are connected to the control unit 35 as shown in FIG. 9.

Figure 8:
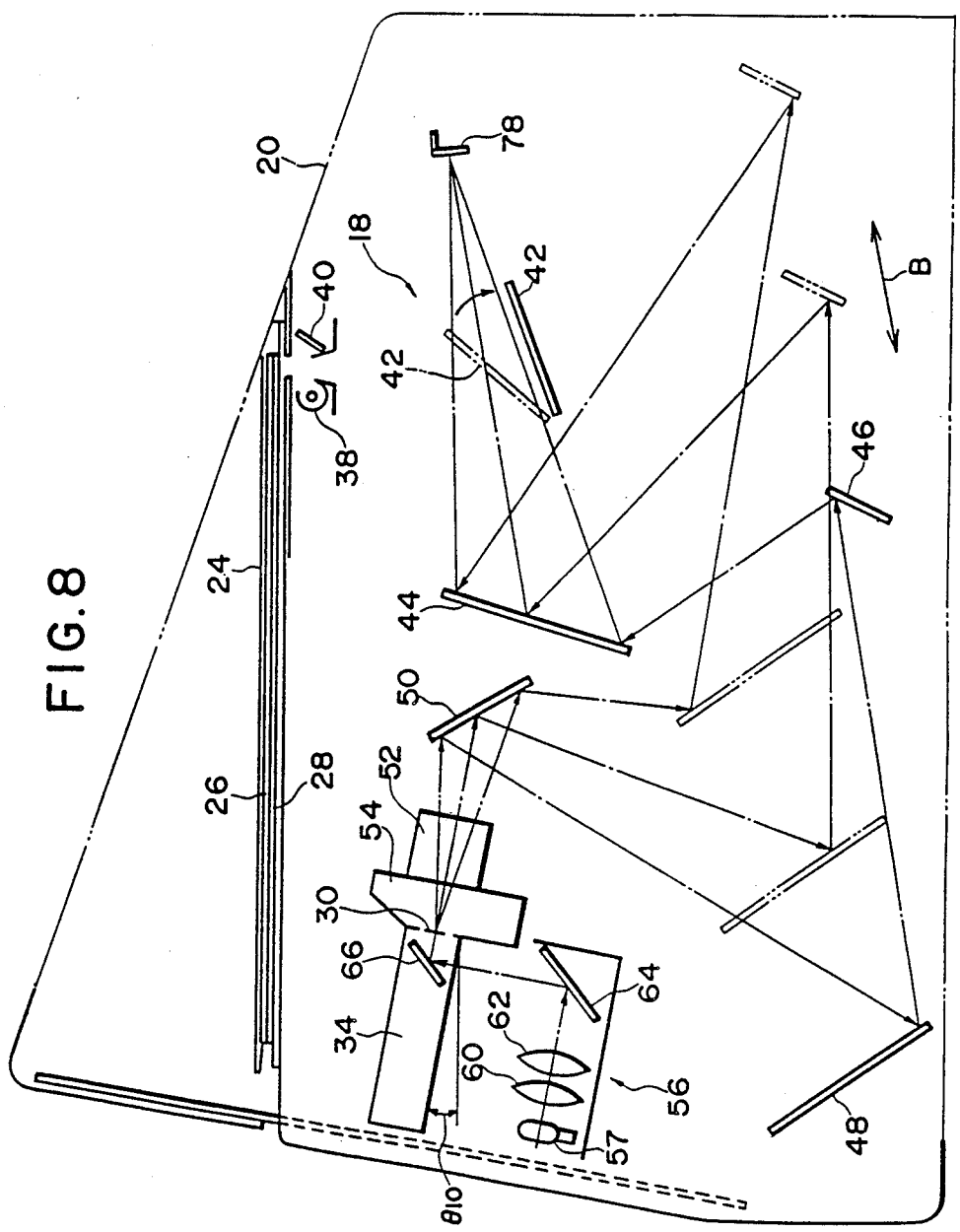
FIG. 8 is a view corresponding to FIG. 2, illustrating particularly an electrical transmission optical system.

A description will be made hereinunder as to the image electrical transmission optical system 18, with specific reference to FIG. 8.

The image electrical transmission optical system 18 is intended for transmitting the image recorded on the electrophotographic film 30 to an image detection surface of a facsimile sensor 78 which is disposed behind the first mirror 42.

The image electrical transmission system 18 employs a light source for illuminating the electrophotographic film 30. This light source is the same as the light source 56 used in the projection optical system 14. The image electrical transmission optical system 18 also employs the lens 52 used in the photographing and projecting optical systems, as well as the third mirror 50, the second movable mirror 48, the first movable mirror 46 and the second mirror 44 which are employed in the photographing system 12 and the copying optical system 16.

The facsimile sensor 78 is disposed behind the second mirror 44 so as to oppose the reflection surface of the second mirror 44. The first mirror 42 is adapted to be rotated by the power of the driving device 79 from a position shown by the two-dot-and-dash line in FIG. 8 (position where it serves for the photographing optical system, i.e., the position between the second mirror 44 and the detection surface of the facsimile sensor 78) to a position shown by a solid line in the same Figure. As will be seen from FIG. 9, the driving device 79 is connected to the control unit 35.

The surface of the electrophotographic film 30 is scanned as a result of the movement of the first movable mirror 46 and the second movable mirror 48, and the scanned image is delivered to the detection surface of the facsimile sensor 78.

A description will be made hereinafter as to the operation of this embodiment, with specific reference to FIG. 10 which shows a flow chart illustrating the operation.

As the power supply is turned on, initial values are set in Step 100 so that the first movable mirror 46, the second movable mirror 48, the first mirror 42 and the second mirror 44 are set in the respective positions shown by solid lines in FIG. 2.

In Step 102, a judgment is conducted as to whether an input from the control keyboard 33 is for photographing the image on the original to form an image record on the electrophotographic film 30. If the input is for the photographing operation, the driving device 39 operates in Step 104 so as to drive the original table 24. Before the original table 24 is moved, the original is set on the table 24 and the cassette 34 is loaded from the cassette mounting portion 32. In Step 106, the driving device 80 is activated so that the first movable mirror 46 is moved. In Step 108, the driving device 47 is actuated so that the second movable mirror 48 is moved. In consequence, the image on the original set on the original table 24 is scanned so that the image is photographed and recorded on the electrophotographic film 30.

In consequence, the image can be scanned without requiring movement of the lens which focuses the image onto the electrophotographic film 30 in a contracting manner, so that the precision of the image formed on the electrophotographic film 30 is improved.

When the judgment in Step 102 has proved that the input is not for the photographing, a judgment is conducted in Step 110 as to whether or not the image recorded on the electrophotographic film 30 is to be projected onto the screen 22. When it is judged that the image is to be projected, the driving device 69 is actuated in Step 112 so as to rotate the mirror 68 from the position shown by the two-dot-and-dash line in FIG. 4 to the position of the solid line in the same Figure. As the light source 56 is started in Step 114, the image recorded in the electrophotographic film 30 is projected onto the screen 22.

When the judgment in Step 110 has proved that the image is not to be projected, the process proceeds to Step 116 in which judgment is conducted as to whether the image recorded in the electrophotographic film 30 is to be copied or not. When it is confirmed that the image is to be copied, the driving device 45 is activated in Step 118 so that the second mirror 44 is rotated from the position shown by two-dot-and-dash line to the position of solid line in FIG. 7.

Then, the light source 56 is started in Step 118 and, in Step 122, the driving device 77 is actuated to rotate the copying photosensitive drum 76. Then, Steps 106 and 108 are followed so that the first and the second mirrors are moved. Consequently, the image formed on the electrophotographic film 30 is scanned and the scanned image is projected onto the copying photosensitive drum 76.

According to the present invention, it is not necessary to provide an image scanning mirror specifically for the copying optical system 16 besides the image scanning mirror used in the photographing optical system. In consequence, the construction of the optical system is simplified and the size of the electrophotographic apparatus is reduced advantageously.

When the judgment conducted in Step 116 has proved that the image is not to be copied, the process proceeds to Step 124 in which a judgment is conducted as to whether or not the image recorded on the electrophotographic film 30 is to be electrically transmitted. If the judgment proves that the image is to be electrically transmitted, the process proceeds to Step 126 in which the driving device 79 is actuated so that the first mirror 42 is rotated from the position of the two-dot-and-dash line to the position of the solid line in FIG. 8. Then, in Step 128, the light source 56 is started and, in Step 130, a facsimile sensor 78 is turned on. Steps 106 and 108 are then followed so that the first movable mirror 46 and the second movable mirror 48 are moved, whereby the image recorded on the electrophotographic film 30 is scanned and the thus scanned image is delivered to the detection surface of the facsimile sensor 78. The thus delivered image is detected by the facsimile sensor 78 and is electrically transmitted. It is to be understood that the necessity is eliminated for the provision of an image scanning mirror specifically for the purpose of the image electrical transmission optical system 18 besides the mirror used in the photographing and copying optical system. This also contributes to the simplification of construction of the optical systems and to a reduction in the size of the image recording apparatus.

What is claimed is:

1. An image recording apparatus for focusing a first image recorded on an original onto a film, said apparatus comprising: a movable original table for mounting an original and moving said original in a first direction of movement;
    means comprising a slit sized to cover only a portion of said original and disposed in a direction perpendicular to the first direction of movement of said original table;
    scanning means, comprising two mirrors, which is movable in a second direction of movement, substantially the same as the first direction of movement of said original table, so as to scan said image on said original through said slit; and
    a stationary lens structure for focusing the light reflected by said scanning means onto said film during movement of said scanning means to effect a scan.

2. An image recording apparatus according to claim 1, further comprising a light source for illuminating said original through said slit.

3. An image recording apparatus according to claim 2, wherein one of the two mirrors of said scanning means comprises a first scanning mirror which receives the light reflected by said original, the other thereof comprising a second scanning mirror for applying the light from said first scanning mirror to said lens.

4. An image recording apparatus according to claim 3, wherein said first and second scanning mirrors are operative to perform scanning simultaneously in predetermined directions.

5. An image recording apparatus according to claim 1, further comprising a copying photosensitive drum carrying at its surface a photosensitive material, and a copying optical system for scanning a second image formed by said first image focused on said film so as to focus said second image on said photosensitive material.

6. An image recording apparatus according to claim 1, further comprising an image detector for electrical transmission having an image detection surface and an electrical transmission optical system for focusing said second image on said image detection surface.

7. An image recording apparatus for focusing a first image recorded on an original onto a film so as to form a second image on said film and for copying said second image formed on said film onto a photosensitive member, comprising:
    a movable original table for mounting an original and moving said original in a direction of movement;
    means comprising a slit provided to extend in a direction perpendicular to the direction of movement of said original table;
    a first light source for illuminating said original through said slit;
    a second light source for illuminating said film;
    a copying photosensitive means carrying at its surface said photosensitive member; and
    scanning mirror means capable of scanning, through said slit, said original which is being moved by said original table while being illuminated with the light from said first light source, thereby to focus said first image on said film which is stationary, said scanning mirror means further capable of scanning said film while said film is being illuminated by the light from said second light source, thereby focusing said second image onto said photosensitive member on said copying photosensitive means.

8. An image recording apparatus according to claim 7, wherein said scanning mirror means includes a pair of scanning mirrors which are arranged to move simultaneously and to enable the light reflected from one to impinge into the other.

9. An image recording apparatus according to claim 7, further comprising: an image detection device for electrical transmission having an image detection surface, and an electrical transmission optical system for scanning said second image so as.to focus said second image onto said image detection surface.

10. An image recording apparatus according to claim 9, wherein the scanning of said second image in said electrical transmission optical system is performed by said scanning mirror means.

11. An image forming apparatus capable of scanning a first image recorded on an original thereby providing a photographing process and focusing said first image onto a film so as to form a second image on said film, and capable of scanning said second image on said film so s to focus said second image onto a photosensitive member on a photosensitive drum, thereby providing a process of copying said second image onto said photosensitive member, comprising
    scanning mirror means comprising at least one mirror for scanning said second image by movement of said at least one mirror; and
    an image detection device operative to receive an image and produce a signal for electrical transmission, said device having an image detection surface, said second image being focused on said detection surface through scanning of said second image by movement of said scanning mirror means.

12. An image recording apparatus according to claim 11, wherein said scanning mirror means comprises scanning means for scanning said first image during the photographing process.

13. An image recording apparatus according to claim 11, wherein said scanning mirror means comprises scanning mirror means for scanning said second image during the copying process.

14. An image recording apparatus according to claim 11, wherein said scanning mirror means comprises means for scanning said first image during the photographing process and means for scanning said second image during the copying process.

15. An image recording apparatus according to claim 11, wherein said scanning mirror means comprises a first scanning mirror for receiving said second image and being operative to perform a scanning in a first predetermined direction and a second scanning mirror for receiving the light reflected by said first scanning mirror and being operative to focus the received light on said image detection surface of said image detection device for electrical transmission.

16. An image recording apparatus according to claim 15, further comprising a light source for illuminating said film in which said second image is recorded, a first mirror disposed between said film and said first scanning mirror and adapted for reflecting the light transmitted through said film towards said first scanning mirror, and a second mirror disposed between said second scanning mirror and said image detection device for electrical transmission and adapted for reflecting the light from said second scanning mirror to said image detection surface.

17. An image recording apparatus according to claim 11, wherein said scanning mirror means includes a pair of scanning mirrors which are movable simultaneously and whose reflective surfaces oppose each other so that the light reflected from one impinges upon the other.

* * * * *